(12) United States Patent
Dementhon et al.

(10) Patent No.: US 6,176,896 B1
(45) Date of Patent: Jan. 23, 2001

(54) PROCESS AND DEVICE FOR LOCAL AND CONTROLLED REGENERATION OF A PARTICLE FILTER

(75) Inventors: Jean-Baptiste Dementhon, Paris; Brigitte Martin, Saint Genis Laval; Bruno Bourry, Quintenas, all of (FR)

(73) Assignee: Institut Francais du Petrole, Rueil-Malmaison cedex (FR)

( * ) Notice: Under 35 U.S.C. 154(b), the term of this patent shall be extended for 0 days.

(21) Appl. No.: 09/301,602

(22) Filed: Apr. 29, 1999

(30) Foreign Application Priority Data

Apr. 29, 1998 (FR) .................................................. 98 05361

(51) Int. Cl.⁷ .................................................. B01D 35/18
(52) U.S. Cl. ..................................... 95/14; 95/18; 95/283; 55/282.3; 55/DIG. 10; 55/DIG. 30
(58) Field of Search .................................... 95/14, 16, 18, 95/283; 55/282.3, 523, DIG. 10, DIG. 30

(56) References Cited

U.S. PATENT DOCUMENTS

| | | | |
|---|---|---|---|
| 4,404,795 | * 9/1983 | Oishi et al. | 55/DIG. 10 |
| 4,450,682 | * 5/1984 | Sato et al. | 55/DIG. 10 |
| 4,512,147 | * 4/1985 | Wong | 55/DIG. 10 |
| 4,516,993 | * 5/1985 | Takeuchi et al. | 55/DIG. 30 |
| 4,522,027 | * 6/1985 | Hasegawa et al. | 55/DIG. 10 |
| 4,656,832 | 4/1987 | Yukihisa | 60/303 |
| 5,067,973 | * 11/1991 | Pattas | 55/DIG. 30 |
| 5,457,945 | * 10/1995 | Adiletta | 95/283 X |
| 5,489,319 | * 2/1996 | Tokuda et al. | 55/DIG. 30 |
| 5,551,971 | * 9/1996 | Chadderton et al. | 95/283 X |
| 5,651,248 | * 7/1997 | Kawamura | 55/DIG. 30 |
| 5,853,459 | * 12/1998 | Kuwamoto et al. | 95/18 X |
| 5,972,075 | * 10/1999 | Fukuda et al. | 55/DIG. 10 |

FOREIGN PATENT DOCUMENTS

| | | |
|---|---|---|
| 449791 | 10/1991 | (EP) . |
| 829622 | 3/1998 | (EP) . |
| 2-123219 | * 5/1990 | (JP) ................................ 55/DIG. 10 |

OTHER PUBLICATIONS

Patent Absracts of Japan vol. 18, No. 76 (M–1556), Feb. 8, 1994 & JP 05 288038A (Toyota Motor Corp.) Nov. 2, 1993.
Patent Abstracts of Japan vol. 009, No. 290 (M–430) Nov. 16, 1985 & JP 60 128920 A (Mazda KK) Jul. 10, 1985.

* cited by examiner

Primary Examiner—Robert H. Spitzer
(74) Attorney, Agent, or Firm—Antonelli, Terry Stout & Kraus, LLP

(57) ABSTRACT

A process and device for local permeability evaluation and local regeneration of a particle filter consisting of several juxtaposed zones through which a flow of gas to be scrubbed is passed include the steps of and apparatus for measuring the temperature of the flow upstream from the filter, measuring the temperature in at least one of the zones forming the filter, evaluating the thermal inertia of at least one of the zones by relative measurement of the temperature or of the local resistance to the temperature upstream from the filter, deducing from this the local permeability of the filter and locally regenerating the filter.

18 Claims, 2 Drawing Sheets

FOULING

PROCESS AND DEVICE FOR LOCAL AND CONTROLLED REGENERATION OF A PARTICLE FILTER

FIELD OF THE INVENTION

The present invention relates to the field of particle filters and more particularly to the determination of their fouling.

These filtering elements are generally situated in the exhaust lines of internal-combustion engines, and they are intended to collect and/or to remove certain particles contained in the gas flow so that the exhaust line discharges a gas stripped from said particles downstream, i.e. into the atmosphere.

Fouling thus appears to be a major problem for particle filters, and various methods and/or devices have already been developed with the constant objective of regenerating the filter.

BACKGROUND OF THE INVENTION

It may consist, according to a well-known concept, in periodically burning the soot deposits.

This combustion sometimes occurs naturally when the temperature of the gases reaches by itself the level required for initiating oxidation of the particles. However, medium operating conditions generally lead to temperatures that are too low to spontaneously ignite combustion of the particles. This thus leads to clogging of the filter, which is a serious disadvantage for the engine efficiency and eventually imperils the operation thereof. Complete regeneration of the filter then has to be performed artificially and arbitrarily.

Many techniques have been developed to that end. They can be based on changes in the running of the engine: intake throttling, exhaust throttling, advanced injection lag, or connected with an energy supply in the exhaust gases or in the filter (electric resistor, burner, microwave . . . ). It is then necessary to control these various devices by means of an external control managed by a computer. Most often, the criterion taken into account for triggering regeneration is the back pressure in the exhaust line.

In order to facilitate regeneration of particle filters, a different and complementary approach of chemical nature consists in adding to the fuel an organometallic additive for example, that is thereafter found in the soot deposit, which generally leads to a decrease in the ignition temperature and therefore to an increase in the regeneration frequency.

Examples of the most commonly used additives are copper, iron, cerium, sodium . . . Studies show that, in the presence of such additives, partial regenerations can occur spontaneously for relatively low exhaust gas temperatures (~200° C.).

However, for certain types of pipe, problems linked with the back pressure can remain, so that an exterior energy supply can be necessary, such as for example electric heating.

As regards energy consumption, most well-known systems using electric heating of the filter include global heating of the filtering element. This leads to a high energy consumption that is more or less controlled. Generally, the electric power required for triggering total regeneration of the filter is high and often hardly compatible with the electric resources on board the vehicle. Patent EP-B1-0,485,179 illustrates a system based on this principle.

French patent application EN.96/13,855 filed in the name of the applicant describes a concept allowing to adapt the electric power and the energy distribution in the filter to all the operating conditions of the vehicle. This concept consists in dividing the filtering unit into several zones, in equipping each of said zones with a resistor and, after detecting the global fouling of the filtering unit, in selectively activating one or more resistors. Valves are furthermore associated with the resistors in order to increase or to attenuate the effect of the resistors.

This regeneration modulation is however based on a general and global fouling evaluation.

Besides, the regeneration conditions can depend to a large extent on the state of fouling of the filter. In general, electric heating allows no flexible action according to the fouling of the filter.

The present invention allows this technology to be improved by furthermore achieving a local fouling evaluation.

SUMMARY OF THE INVENTION

More specifically, according to the invention, the local permeability of a particle filter and therefore the fouling thereof are evaluated, then regeneration is activated and modulated accordingly.

Furthermore, these various actions can be performed in real time, in a precise and reliable way.

The flow of gas to be scrubbed flows past the particle filter that consists of several juxtaposed zones through which the flow of gas to be scrubbed can also flow from one end to the other.

The object of the invention thus is a process for evaluating the local permeability of a particle filter consisting in:

measuring the temperature of said flow upstream from said filter, measuring the temperature in at least one of said zones forming the filter, evaluating the thermal inertia of at least one of said zones via relative measurement of the temperature or of the local resistance to said temperature upstream from the filter, deducing therefrom the local permeability of the filter, and locally regenerating said filter.

The process according to the invention further consists in locally regenerating at least one of said zones when said permeability is above a certain threshold value.

More precisely, local regeneration consists in local heating.

According to an embodiment of the invention, the process can consist in installing several resistors in several zones of the filter and one resistor upstream from the filter, in measuring each resistor at predetermined time intervals and in evaluating the relative resistance of each zone so as to deduce the local permeability of each zone.

Furthermore, the process according to the invention can consist in installing at least one valve upstream from at least one zone of the filter and in independently modulating the opening according to the desired local regeneration.

According to the invention, the measurement of each local resistor ($R_i$) itself is used to modulate the opening of each associated valve.

Besides, the measurement of each local resistor ($R_i$) can be stored separately in order to determine a clogging or a breakage of said resistor.

Without departing from the scope of the invention, the most fouled zones are regenerated first.

In addition, the process according to the invention can consist in injecting hydrocarbons locally and independently into at least one of said zones of the filter.

The present invention also relates to a device intended for local permeability evaluation and local regeneration of a particle filter consisting of several juxtaposed zones and through which a flow of gas to be scrubbed passes, comprising a means for evaluating the thermal inertia of at least one zone of the filter, associated with a means for measuring the temperature upstream from and at various points in the filter, and a means intended for local regeneration of the filter, cooperating with the means intended for evaluation of the local permeability of the filter.

More precisely, the means intended for local regeneration of the filter consists of at least one resistive element placed in a zone of said filter.

According to an embodiment of the invention, the means for evaluating the thermal inertia consists of a temperature detector placed in the gaseous flow upstream from the filter and of at least one temperature detector locally installed in at least one zone of the filter.

Without departing from the scope of the invention, the means for evaluating the thermal inertia comprises a resistive element placed in the gaseous flow upstream from said filter, associated with at least one resistive element installed in a zone of said filter.

Furthermore, the device according to the invention can comprise at least one valve situated upstream from a zone of the filter, associated with the local regeneration of said filter.

Advantageously, it further comprises a means intended for local injection of hydrocarbons into at least one of said zones of the filter, associated with the local regeneration of said filter.

According to the invention, the local permeability evaluation device can also comprise a means for detecting a malfunction of at least one of the zones of the filter.

This means can allow to detect a clogging and/or breakage of at least one of the zones of the filter.

BRIEF DESCRIPTION OF THE DRAWINGS

Other features, advantages and details of the invention will be clear from reading the description hereafter, given by way of non limitative example, with reference to the accompanying drawings wherein.

DETAILED DESCRIPTION OF THE INVENTION

Figure 1:
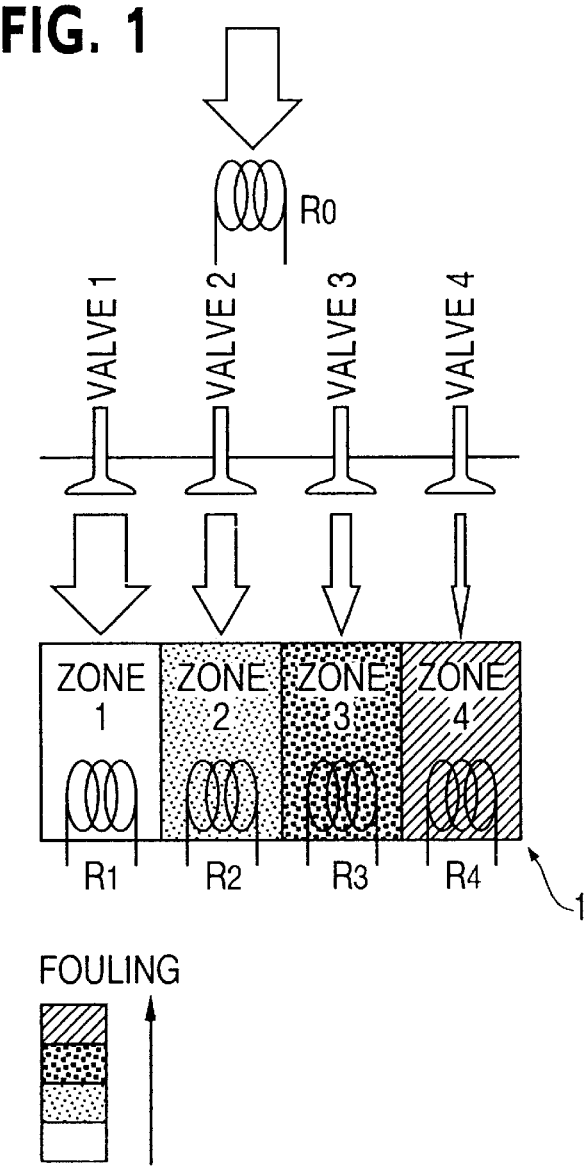
FIG. 1 is a flowsheet of an embodiment of the invention.

As can be seen in FIG. 1, the invention comprises a particle filter 1 divided into several sections (zones 1 to 4 here), each one being likely to be crossed through by the flow to be scrubbed. In the case of a <<wall-flow>> type filter, each zone will represent a definite set of channels; in the case of filters based on an arrangement of fibers, a section will represent a cartridge section for example. These various zones can be heated separately by local electric resistors (Ri) which allow, when activated, partial regeneration of the filter. Using local heating affords several advantages:

The power required for triggering the combustion is low, and the dimension of each resistor allows to make it compatible with the power resources available;

For a wide range of engine working points, regeneration of a limited part of the filter allows to recover a back pressure close to the off-load pressure because the overall dimension of the filter is suited to the maximum flow of gas (maximum power);

Activation of a localized hot spot at a single point of the filter can allow to create a seat of slow combustion propagating the combustion to the other zones of the filter, which allows to keep a low back pressure throughout;

The heating conditions (number of active resistors, activation time . . . ) can be optimized according to the engine conditions, the fouling conditions and the available power;

The spatial distribution of the energy supplied to the filter being adjustable, this allows to prevent too great a local accumulation of particles, which is an asset for the durability of the filtering support.

Without departing from the scope of the invention, temperature detectors can be placed in one or more zones of filter 1 in order to give a measurement of the temperature in each of these zones.

Moreover, the system according to the invention can also comprise valves Vi (valves 1 to 4 here) allowing to control the flow of gas in each section of the filter or in various groups of sections. These valves present various advantages:

They allow an inhomogeneous fouling distribution, which optimizes the relation between the total mass loaded in the filter as a whole and the back pressure. The distribution is inhomogeneous both as regards the nature of the fouling and the amount thereof;

The various valves Vi favour heating of the different sections Zi and therefore maintain their regeneration by controlling the distribution of the gas flow.

The invention further comprises a general resistor Ro placed upstream from particle filter 1 itself, i.e. upstream from resistors Ri.

This resistor Ro and the various resistors Ri installed in the various zones vary like the temperature of the gas surrounding them. An indirect measurement of the temperature of the gas flow upstream from the filter and of the <<local>> temperature in each one of the zones forming the filter is thus obtained.

Without departing from the scope of the invention, a means allowing direct measurement of the temperature, such as a thermocouple for example, can be placed upstream from filter 1.

Figure 2:
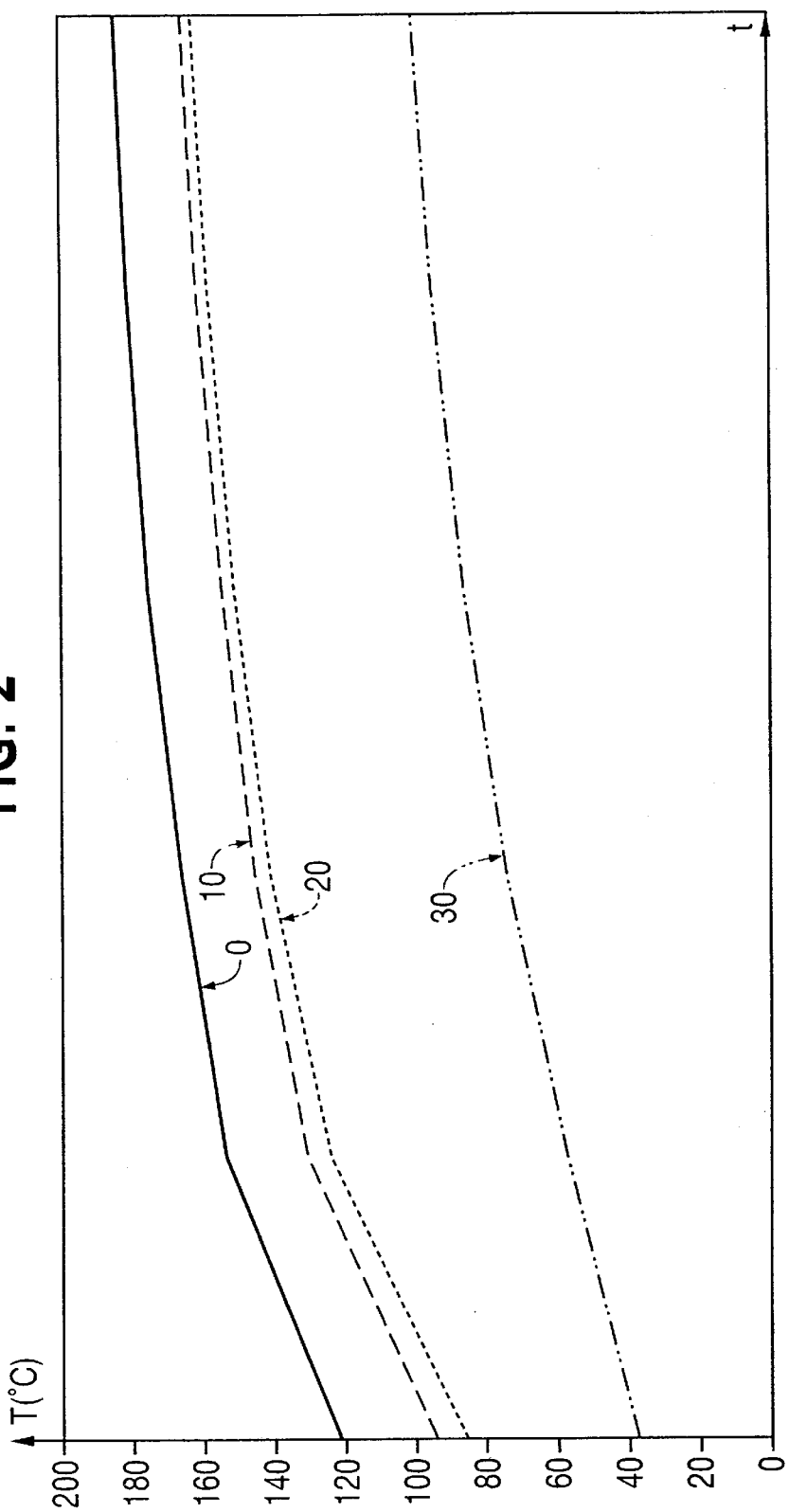
FIG. 2 is a series of curves showing the evolution of temperature as a function of time in different zones and upstream from the particle filter according to the invention.

FIG. 2 shows the evolution of the temperature of the various zones (curves 10, 20, 30) of filter 1 and upstream from the filter (curve 0). It can be seen that the temperature variation in the various zones presents a certain difference in relation to the temperature upstream from the filter. This difference directly depends on the flow of gas passing through each zone, i.e. on the fouling of each zone.

The working principle of the invention is thus based on a relative evaluation of the local flow of gas flowing past the filtering medium, which directly depends on the local permeability of the medium and therefore on its fouling level. This is possible only because the flow of gas flows past the filter from one end to the other.

The local fouling is thus evaluated from the thermal inertia of a zone of a particle filter; according to FIG. 2, the most fouled zone corresponds to curve 30 since its temperature does not <<follow>> that of curve 0. A slight slope change can be observed for curve 30 long after that of curve 0. The thermal inertia of the corresponding zone is therefore very high.

A contrario, curves 10 and 20, otherwise very close to each other, show practically no delay in relation to curve 0;

the slope change occurs nearly at the same time. The corresponding zones of the filter thus have a flow rate substantially equal to that in the zone situated upstream from the filter. They are therefore not very fouled.

According to the invention, the various thermal inertias are evaluated in real time via the relative measurement of the local resistors (Ri) in relation to the general resistor (Ro), or via the relative measurement of the local temperatures in relation to the temperature measured upstream from the filter.

Figure 3:
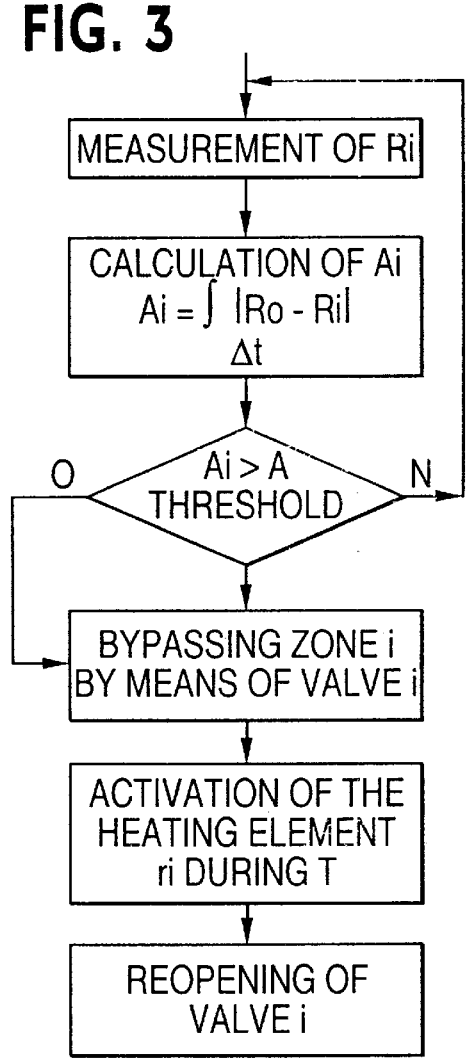
FIG. 3 is a flow chart showing the main stages of the invention.

FIG. 3 illustrates more in detail the processing of the measurements according to an embodiment of the invention, as illustrated in FIG. 1:

The local resistors Ri and the general resistor Ro are measured at predetermined time intervals, for example every second. The absolute value Ai of the difference between Ro and each local resistor Ri is then calculated.

The value of Ai is thereafter compared with a threshold value $A_{threshold}$ that is actually the allowable maximum difference. If Ai is below this threshold, calculations are continued without any changes. If Ai is above the set threshold value, the valve Vi corresponding to the fouled zone is actuated in order to divert the flow from the zone. At the same time, the corresponding heating element is activated for a predetermined time in order to locally regenerate the zone found fouled.

After this period of time, one considers that regeneration is complete, i.e. zone i is no longer fouled. The corresponding valve Vi is thus reopened so that the gas can flow past this zone.

Furthermore, the measurement of each local resistor Ri can be used intrinsically (in absolute) in order to modulate the opening of corresponding valve Vi during regeneration. This allows to optimize heating until the initiation temperature is reached, to properly proportion the oxygen supply allowing to support the combustion, or on the contrary to smother the combustion in case of too great a heat release.

Furthermore, it is possible to take advantage of local resistor measurements to detect mishaps such as the breakage of a zone of filter 1.

All the measurements according to the invention can generally be part of the general electronic control diagnosis of the engine.

The present invention thus affords the following advantages:

It allows local fouling evaluation, which optimizes the local regeneration strategies.

It notably prevents clogging of too extensive zones of the filter, which is penalizing for full-load running.

Furthermore, the present invention allows to intervene very early, before the amount of soot deposited leads to too great a heat release.

Moreover, by choosing to regenerate the most fouled zones first, the regeneration efficiency is optimum since the spontaneous propagation of regeneration to the less fouled zones is nearly certain. It is therefore no longer necessary to create another regeneration artificially.

The various local resistors can be used to detect structural degradations of the filter, or definitive clogging. In fact, their intrinsic value allows this type of diagnosis.

Furthermore, according to the local permeability detected in accordance with the invention, it is possible to inject hydrocarbons into one or more zones of filter 1 in order to favour combustion, i.e. regeneration in either zone.

What is claimed is:

1. A process intended for local permeability evaluation and local regeneration of a particle filter consisting of several juxtaposed zones through which a flow of gas to be scrubbed is passed, the process comprising the steps of:

measuring the temperature of said flow upstream from said filter, measuring the temperature in at least one of said zones forming the filter, evaluating the thermal inertia of at least one of said zones via relative measurement of the temperature or of the local resistance to said temperature upstream from the filter, deducing therefrom the local permeability of the filter, and locally regenerating said filter.

2. An evaluation process as claimed in claim 1, characterized in that at least one of said zones of the filter is locally regenerated when said permeability is above a certain threshold value.

3. An evaluation process as claimed in claim 2, characterized in that local regeneration consists in local heating.

4. An evaluation process as claimed in claim 1, characterized in that the process consists in installing a resistor in each of the several juxtaposed zones of the filter and one resistor upstream from the filter, in measuring each resistor at predetermined time intervals and in evaluating the relative resistance of each zone so as to deduce the local permeability of each zone.

5. A process as claimed in claim 4, characterized in that the process further consists in installing at least one valve upstream from at least one of the several juxtaposed zones of the filter and in modulating its opening independently according to the desired local regeneration.

6. A process as claimed in claim 5, characterized in that measurement of each of the local resistors (Ri) is used itself to modulate the opening of each associated valve.

7. A process as claimed in claim 4, characterized in that the measurement of each local resistor (Ri) is stored separately in order to determine a clogging or breakage of said resistor.

8. A process as claimed in claim 1, characterized in that the most fouled zones are regenerated first.

9. A process as claimed in claim 1, characterized in that the process further consists in locally and independently injecting hydrocarbons into at least one of said zones of the filter.

10. A device intended for local permeability evaluation and local regeneration, over the total length thereof, of a particle filter consisting of several juxtaposed zones through which a flow of gas to be scrubbed is passed, characterized in that the device comprises a means for evaluating the thermal inertia of at least one of the several juxtaposed zones of the filter, associated with a means for measuring the temperature upstream from and at different points in the filter, and a means intended for local regeneration of said filter that cooperates with the means intended for evaluating the local permeability of the filter.

11. A device as claimed in claim 10, characterized in that the means intended for local regeneration of the filter consists of at least one resistive element installed in at least one of the several juxtaposed zones of said filter.

12. A device as claimed in claim 10, characterized in that the thermal inertia evaluation means consists of a temperature detector situated in the gaseous flow upstream from the filter and at least one temperature detector locally installed in at least one of the several juxtaposed zones of the filter.

13. A device as claimed in claim 10, characterized in that the thermal inertia evaluation means comprises a resistive element placed in the gaseous flow upstream from said filter, associated with at least one resistive element installed in at least one of the several juxtaposed zones of said filter.

14. A device as claimed in claim 10, characterized in that the device further comprises at least one valve placed upstream from at least one of the several juxtaposed zones of the filter, associated with local regeneration of said filter.

15. A device as claimed in claim 10, characterized in that the device further comprises a means for local injection of hydrocarbons into at least one of the several juxtaposed zones of the filter, associated with local regeneration of said filter.

16. A device as claimed in claim 10, characterized in that the device further comprises a means for detecting a malfunction of at least one of the several juxtaposed zones of the filter.

17. A device as claimed in claim 16, characterized in that said means for detecting a malfunction allows to detect clogging of said at least one of the several juxtaposed zones of the filter.

18. A device as claimed in claim 16, characterized in that said means for detecting a malfunction allows to detect a breakage in said at least one of the several juxtaposed zones of the filter.

* * * * *